United States Patent
Hassan et al.

(10) Patent No.: US 11,856,127 B1
(45) Date of Patent: Dec. 26, 2023

(54) EVENT TRIGGERED CALL TRANSITION

(71) Applicant: Microsoft Technology Licensing, LLC, Redmond, WA (US)

(72) Inventors: Amer Aref Hassan, Kirkland, WA (US); Vandana Thomas, Redmond, WA (US); Michael J. Davis, Seattle, WA (US); Abhilash Chandrasekharan Nair, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 17/842,090

(22) Filed: Jun. 16, 2022

(51) Int. Cl.
*H04M 1/72484* (2021.01)
*H04L 65/1089* (2022.01)
*H04M 1/72403* (2021.01)
*H04M 1/72463* (2021.01)

(52) U.S. Cl.
CPC .... *H04M 1/72484* (2021.01); *H04L 65/1089* (2013.01); *H04M 1/72403* (2021.01); *H04M 1/724631* (2022.02)

(58) Field of Classification Search
CPC ......... H04M 1/72484; H04M 1/72403; H04M 1/72631; H04L 65/1089
See application file for complete search history.

(56) References Cited

U.S. PATENT DOCUMENTS

| 9,351,203 | B2 | 3/2016 | Sidhu et al. | |
|---|---|---|---|---|
| 2014/0274006 | A1* | 9/2014 | Mutya | H04W 4/16 455/416 |
| 2015/0350448 | A1* | 12/2015 | Coffman | H04M 3/42263 379/212.01 |

FOREIGN PATENT DOCUMENTS

| CN | 105872254 A | * | 8/2016 |
|---|---|---|---|
| EP | 2704394 A1 | | 3/2014 |
| WO | 2015183537 A1 | | 12/2015 |

OTHER PUBLICATIONS

"International Search Report and Written Opinion Issued in PCT Application No. PCT/US23/019549", dated Jul. 12, 2023, 10 Pages.

* cited by examiner

*Primary Examiner* — Farid Seyedvosoghi
(74) *Attorney, Agent, or Firm* — Schwegman Lundberg & Woessner, P.A.

(57) ABSTRACT

A method and system for triggering hand-off of an incoming call event from a default first telephony application to a second telephony application on a device are disclosed, comprising receiving an incoming call event addressed to the device, causing a notification of the incoming call event using the default first telephony application on the device, during the notification of the incoming call event, and without answering the incoming call event using the default first telephony application, receiving a navigation input on a user interface of the device to navigate to the second telephony application on the device, and, responsive to receiving the input to navigate to the second telephony application on the device, causing the second telephony application to be displayed on the device, and accepting the incoming call event using the second telephony application, creating a telephony connection corresponding to the incoming call event.

20 Claims, 4 Drawing Sheets

EVENT TRIGGERED CALL TRANSITION

TECHNICAL FIELD

The present disclosure generally refers to event triggered hand-off of an incoming call event in accordance with some embodiments.

BACKGROUND

The use of software and hardware technologies for meeting and communication services continues to increase as technology evolves. Devices often have multiple applications to perform all or various aspects of such meeting and communication services. Transitioning between the different applications, such as in relation to receiving an incoming call event, can be burdensome.

SUMMARY

Embodiments of the present disclosure include a method and system for triggering hand-off of an incoming call event from a default first telephony application to a second telephony application on a device, comprising receiving an incoming call event addressed to the device, causing a notification of the incoming call event using the default first telephony application on the device, during the notification of the incoming call event, and without answering the incoming call event using the default first telephony application, receiving a navigation input on a user interface of the device to navigate to the second telephony application on the device. Responsive to receiving the input to navigate to the second telephony application on the device, the incoming call event can be accepted using the second telephony application, creating a telephony connection corresponding to the incoming call event.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

The present inventors have recognized, among other things, an event triggered mechanism to improve management of calls on a mobile device between multiple telephony applications. In an example, interacting with a second telephony application (e.g., a meeting application, such as Microsoft Teams, etc.) on a mobile device during a notification of an incoming call event on a default first telephony application (e.g., while an incoming cellular voice call event from a mobile operator (MO) network is "ringing" or otherwise providing an incoming call notification on a default "Phone" application of the mobile device, etc.) can cause the incoming call event (e.g., the cellular voice call event over a first call leg) to instead be accepted on the second telephony application as a feature-rich data call (e.g., over a second call leg), such as without performing a traditional accept or answer action on either of the first or second telephony applications. In certain examples, the second telephony application can include a meeting application configured to provide, over a data connection to a meeting service, one or more rich meeting service features, such as video, file or screen sharing, application sharing, document collaboration, rich messaging, access to corporate directories, group sharing and collaboration, or one or more other meeting application features. The meeting service can be connected to the meeting application through one or more data connections and configured to provide additional meeting services, such as transcription, captioning of shared video content, or one or more other meeting service features.

A technical solution contemplated herein provides, in certain examples, improved telephony application management and operation on a mobile device to address the technical problem of managing a growing number of applications, options, and settings through various menus and applications on mobile devices, being able to provide meeting service features to an unscheduled call without terminating and rescheduling, and triggering device operation using specific inputs, fewer than previously required, causing non-standard changes to the functioning of the mobile device based on the specific inputs, simplifying and improving interaction of users and their devices.

Figure 1:
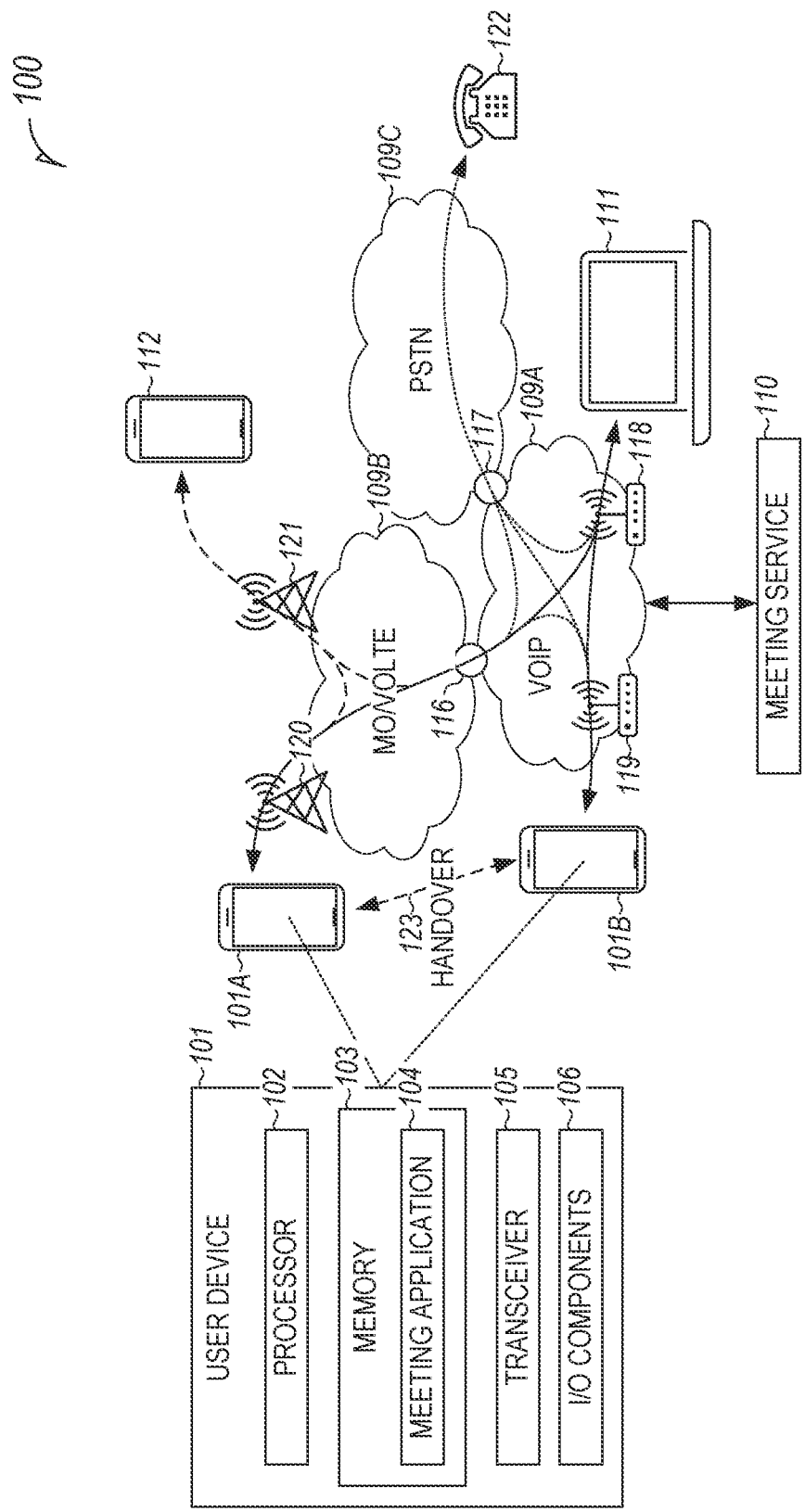
FIG. 1 illustrates an example telecommunication environment in which various users can employ respective devices.

FIG. 1 illustrates an example telecommunication environment 100 in which various users can employ respective devices, such as first, second, third, or fourth user devices 101, 111, 112, 122, respectively, to communicate over one or more portions of a hybrid network including a voice over internet protocol (VoIP) network 109A (e.g., including a core IP network), a mobile operator (MO) or voice over LTE (VoLTE) (MO/VoLTE) network 109B (e.g., one or more of a 2G, 3G, 4G, LTE, or 5G mobile operator network in various combinations or permutations, etc.), a public switched telephone network (PSTN) 109C, and various gateways 116, 117 between the different portions. The telecommunication environment 100 can provide, among other things, access to a meeting service 110 to provide meeting service functions to one or more of the first, second, third, or fourth user devices 101, 111, 112, 122, etc., such as through one or more cellular towers 120, 121, wireless routers 118, 119, or other antennas, transmitters, receivers, or access points to a telecommunication or core IP network, etc.

The first user device 101 is exemplary and can include a processor 102 (e.g., one or more processors), a memory 103, a meeting application 104, a transceiver 105, and one or more input/output (I/O) components 106. The first user device 101 can include a mobile phone or one or more electronic devices configured to operate over an MO network, such as a mobile device having a subscriber identity module (SIM) device. The first user device 101 can be connected to the VoIP network 109A, the MO or VoLTE (MO/VoLTE) network 109B, and often both, simultaneously. The first user device 101 can be represented as a first MO device 101A when connected to the MO/VoLTE network 109B, a first VoIP device 101B when connected to the VoIP network 109A, and in certain examples can perform a handover operation 123 of a call between the different networks. In certain examples, communication over a VoLTE network can require two devices having SIM devices (e.g., SIM cards, etc.), such as the first and third user devices 101, 112.

The meeting application 104 can be configured to interact with or connect to the meeting service 110. While the meeting application 104 can be executed on the first user device 101 (or one or more other user devices), the meeting service 110 is separate and remote from the first user device 101, and can include a server, network, or cloud-based services accessible over the one or more portions of the hybrid network.

In an example, the meeting application 104 can include a local client, such as a Microsoft Teams client (mobile or desktop, etc.), a Skype client, etc., installed on a respective user device and connected to the meeting service 110, such as a cloud-based meeting service or platform (e.g., Microsoft Teams, Skype, etc.). In other examples, the meeting application 104 can include a virtual application (e.g., a network-, web-, server-, or cloud-based application) accessing resources of a respective user device, or combinations of a local client and a virtual application, etc.

The second user device 111 can include an electronic device configured to operate over the VoIP network 109A, such as a mobile device, a laptop computer, a desktop computer, a tablet computer, or various combinations thereof. The fourth user device 122 can include a telephone configured to operate, place, or receive calls over the PSTN 109C.

The meeting service 110 can manage communication sessions, including communication streams, such as emails, documents, chats, comments, texts, images, animations, hyperlinks, or voice or video communication for users associated with one or more online or other communication sessions through meeting applications executed on connected devices, and enable meeting applications or one or more other communication platforms to communicate to or from the respective devices.

The network portions themselves can include and be operated using combinations of hardware and software, including transmitters, receivers, session border controller (SBC) servers, mobile switching centers (MSC), mediation servers, media relays (MR), etc., such as described in the commonly assigned U.S. Pat. No. 9,351,203 "Voice Call Continuity in Hybrid Networks" to Sidhu et al. herein incorporated by reference in its entirety including operation details of hybrid networks such as call continuity or handover between network portions, creation of call legs, anchoring voice or data paths, establishing voice call continuity (VCC) identifiers, etc.

Figure 2:
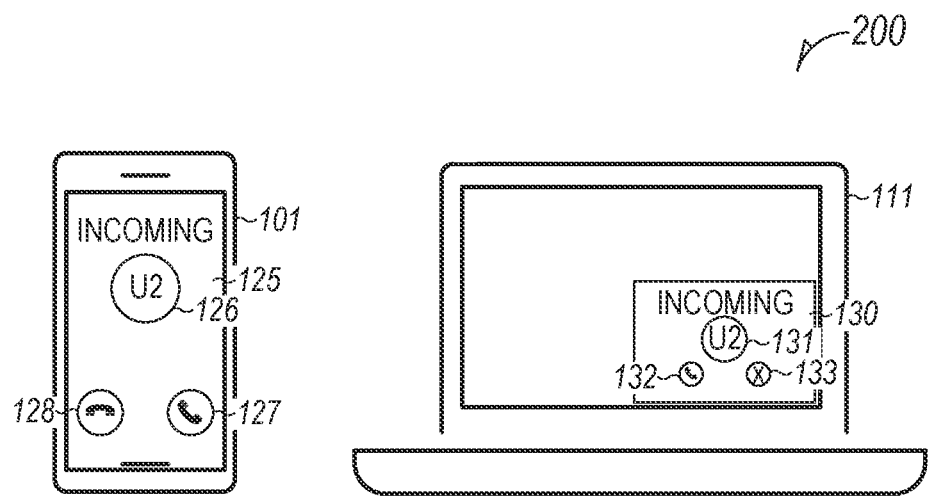
FIG. 2 illustrates an example mobile operator connect environment including first and second user devices of a first user.

FIG. 2 illustrates an example mobile operator connect environment 200 including first and second user devices 101, 111 of a first user, in certain examples, providing meeting application and meeting service features to a single number at multiple devices, in certain examples, associated with the same subscriber identity module (SIM) device. The operator connect environment 200 can provide users with a single number for desk, mobile, and meeting application, enabling a flexible yet integrated call environment, providing presence fidelity to other users and enabling enterprise-grade policies and services (e.g., call recording, retention, transcription, etc.) to voice calls, even cellular voice calls outside of data coverage.

In an example, the first user device 101 can include a mobile device executing a mobile version of a meeting application, and the second user device 111 can include a laptop computer executing a desktop version of the meeting application, each connected to a meeting service through a network (e.g., a voice or data MO network 109B, a VoIP network 109A, etc.). When the first user receives an incoming call to the number or SIM device associated with the first and second user devices 101, 111, both the native dialer, or a default first telephony application (e.g., a Phone application), on the first user device 101 and a meeting application on the second user device 101 can ring simultaneously or separately (e.g., at the first user device 101 for a first time or duration, then both the first and second user devices 101, 111 after a the first time or duration, until the call is answered or sent to voicemail, etc.), depending on one or more settings in one or more meeting applications or otherwise stored in meeting services, etc.

In one specific example, a caller (e.g., a second user), such as using any of a PSTN, a VoIP, or a MO/VoLTE network, through a meeting application (e.g., Microsoft Teams) or other dialer, can initiate a call event to the first user of the mobile operator connect environment 200 including the first and second user devices 101, 111. The first user device 101 can receive the incoming call event using a default first telephony application (e.g., the Phone application of the first user device 101), illustrated on the surface of a screen of the first user device 101 as a notification 125 including an avatar 126 identifying the caller and including answer and decline icons 127, 128.

In this example, a second telephony application, such as the meeting application executed on the first user device 101 (e.g., Microsoft Teams, etc.), is not ringing by design or by settings. However, other end points of the user, such as the second user device 111, also receives the incoming call event through the meeting application illustrated on the surface of a screen of the second user device 111 as a notification 130 including an avatar 131 identifying the caller and including answer and decline icons 132, 133.

In response to the provided notifications 125, 130, the first user can decide in which capacity to answer the incoming call event, for example, as a cellular data call through the default first telephony application on the first user device 101, through the meeting application on the second user device 111 having access to associated meeting service features, or alternatively, through the meeting application (e.g., a second telephony application) on the first user device 101 having access to the associated meeting service features.

Traditionally, to answer such call on the meeting application of the first user device 101, such as to elevate an incoming cellular voice call to a video data call, the settings of the first user device 101 could be changed to place all calls through the meeting application instead of through the default first telephony application (e.g., the native dialer, the Phone application, etc.). For various reasons, such as use of the device for personal, non-work-related calls, etc., this may not be desirable to all users.

In other examples, the first user can answer the call on the default first telephony application, or not, and then separately call the second user back using the second telephony application. This, again, is not desirable, as it requires multiple call event originations, as well as the likelihood that the other user may not pick up, or could be interacting with a voice message system due to the failure to accept the first incoming call event, etc.

In other examples, the first user can answer the call on the default first telephony application, such as a cellular voice call on the MO network, wait for such delay in establishing the call and any noise in doing so, ask the second user to wait, minimize the default first telephony application (without prematurely ending the call), select the second telephony application, open the settings or otherwise navigate the user interface of the second telephony application to join the existing call, and then wait for the second telephony application to take control of the call from the default first telephony application. Such process and actions are burdensome to both the first and second users, introduces numerous opportunities for failure or error, and forces the second user to be placed and remain hold or waiting through the process of the first user navigating the necessary menus, options, and commands.

The present inventors have recognized an improved process to reduce the steps necessary to elevate the incoming call event on the default first telephony application to a feature rich call through the second telephony application. For example, during the notification of the incoming call event on the first user device 101, while the incoming call event is "ringing" in the default first telephony application (or for a time period following the first notification), the first user can automatically trigger the second telephony application to answer the incoming call event by navigating to the second telephony application through a navigation input on a user interface of the first user device 101. Reducing the number and complexity of steps to answer the incoming call event on the second telephony application as opposed to the default first telephony application, where the notification is being provided of the incoming call event on the first user device, is beneficial in that any time to reduce the transition between telephony applications greatly improves the user experience for both users. Additionally, as the call is not answered before transition occurs, less data is required to be transferred over the one or more networks by the first device to a user device of the second user.

In an example, automatically triggering the second telephony application to answer the incoming call event using the second telephony application can additionally include without separately (using an action other than the above navigation) answering or declining the incoming call event using the default first telephony application, or in other examples, without otherwise receiving an action (other than the above navigation) to handover, such as by command, the incoming call event from the default first telephony application to the second telephony application.

Navigating to the second telephony application during the notification or ringing can trigger the first user device to cause the second telephony application to accept the incoming call event instead of the default first telephony application.

Navigating to the second telephony application can include minimizing the default first telephony application and selecting the second telephony application. In other examples, navigating to the second telephony application can include using an application picker or otherwise navigating to an already open application or an application being executed but not currently at the viewable surface of the user interface of the first user device 101. In other examples, navigating to the second telephony application can include opening or launching a closed (e.g., previously closed) or minimized second telephony application on the first user device 101, etc.

Figure 3:
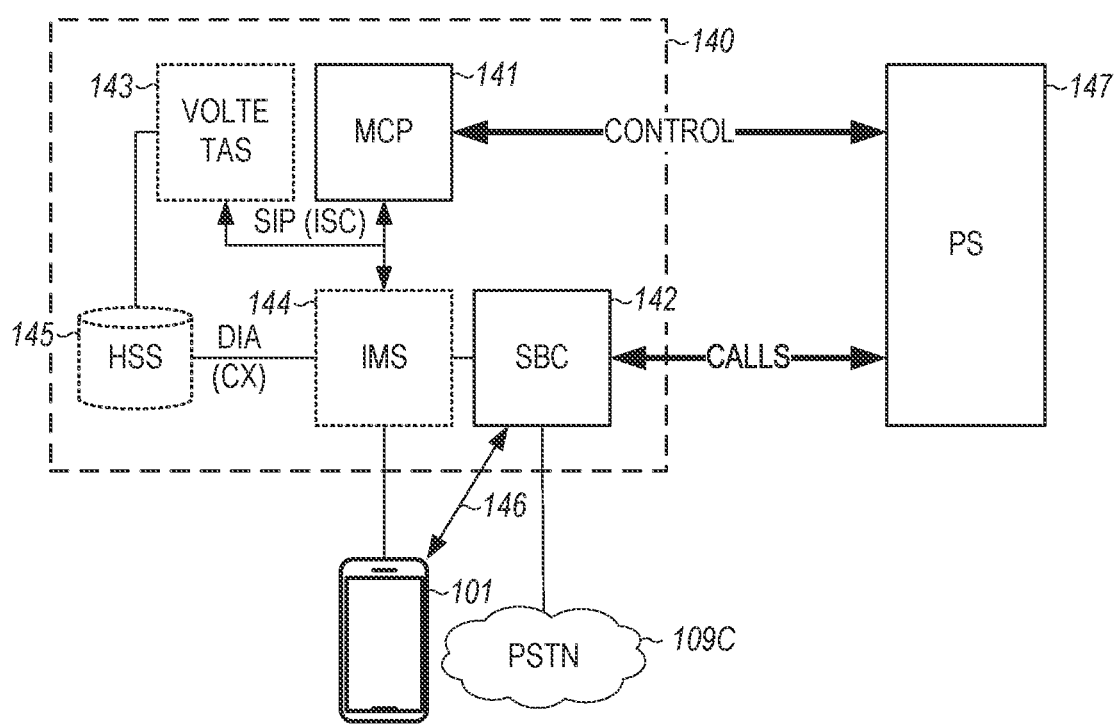
FIG. 3 illustrates an example backend system for answering a call using the second telephony application including operator network components coupled to a first user device.

FIG. 3 illustrates an example backend system 300 for answering a call using the second telephony application including operator network (e.g., MO/VoLTE network 109B) components 140 coupled to a first user device 101, a PSTN 109C, and a phone system (PS) 147 (e.g., a cloud-based phone system), which can be a component of the meeting service 110.

The operator network components can include a mobile control point (MCP) 141 configured to determine through which network resource to deliver or execute a call event, such as one or more network routers, switches, gateways, etc. The MCP 141 can divert mobile calls through the PS 147, including fetching a routing number for the call through an API, and providing one or more controls through a control channel, such as an HTTPS request or responses, etc. The session border controller (SBC) 142 can operate as a gateway between different network portions (e.g., to components of the meeting application, the PSTN network, etc.). Calls, or operator connect trunks, can be managed, transmitted, or received between the PS 147 and the SBC 142.

The VoLTE telephony application server (TAS) 143 includes an application server to provide call features, such as emulating PSTN features or behaviors as well as providing additional features, such as unified messaging, video calling, etc., over a VoLTE network (e.g., the MO/VoLTE network 109B). The IP multimedia subsystem (IMS) 144 can include a mobile IMS core configured to route packet based traffic on the MO/VoLTE network 109B. A home subscriber service (HSS) 145 can include a database configured to manage details of subscribers to of the operator network. The HSS 145 can be provisioned to include the When the first user selects the second telephony application (e.g., Microsoft Teams) during the notification of the incoming call event (e.g., while the default first telephony application is ringing, or in a time period (e.g., 10 seconds, 15 seconds, etc.) following the first notification, etc.), the first device can provide a signal 146 to the SBC 142 that the second telephony application has been opened. In other examples, the MCP 141 can be omitted, and pre-existing routing capabilities in the IMS 144 can divert mobile calls through the default first meeting application.

In an example, the first user device 101 and one or more components of the network 140 collect call quality data, such as based on heuristics, measured SNR, packet error rates, etc. In certain examples, such metrics can be used to determine whether or not the first or second telephony applications should accept the signaling request (e.g., the incoming call event, etc.).

If network quality is determined to be above a threshold, such as described in the commonly assigned U.S. Pat. No. 9,351,203 "Voice Call Continuity in Hybrid Networks" to Sidhu et al., referenced and incorporated above, the first user device 101 or one or more network components can accept the incoming call event using the second telephony application instead of the default first telephony application (e.g., over the internet or a VoIP network 109A, rather than using 5G voice/VoLTE, or one or more other aspect of the MO/VoLTE network 109B. In other examples, if network quality is below the threshold, selection of the second telephony application can trigger acceptance of the incoming call event using the default first telephony application, or trigger acceptance using the second telephony application with a notification that one or more services of the second telephony application are not currently available and, in certain examples, the determined reason for such.

In other examples, the first user device 101 can include a laptop or desktop computer having a default first telephony application (e.g., an IP phone, etc.) different than the second telephony application (e.g., the meeting application, such as Microsoft Teams, etc.). Similar operation is applicable on the laptop or desktop computer.

In additional examples, the first user device 101 can additionally include a proximity sensor to determine if the screen of the phone is within a specific distance of an object, such as to detect whether the phone is in a pocket of a user, face-down on a table, or against an ear of the user, etc. In certain examples, such as to save network bandwidth, a determination of whether or not the first user has the first device 101 to their ear can be determined, such as using information from the proximity sensor, and if so, an in-progress call can be downgraded from a feature-rich data call (e.g., such as with video, etc.) on the second telephony application to a more efficient cellular voice based call using the default first telephony application. In other examples, the downgrade can reduce the amount of data transmitted or received by the first device to be voice data only.

Upon determining that the first user has taken away the phone from their ear, or can see the screen (e.g., not in a pocket or face down, or recognizing a face of the user viewing the screen, etc.), the phone can upgrade the call back to the feature-rich data call, including in certain examples, sending or receiving video data or utilizing one or more other meeting service features, etc. The switching can be controlled, in certain examples, by one or more components of the network, such as one or more of the SBC 142, the MCP 141, the IMS 144, or the PS 147, or various combinations or permutations. In an example, the first user device 101 can include a memory to maintain the upgraded and downgraded connections to be able to transition therebetween until the call has been ended by the first or second user.

Figure 4:
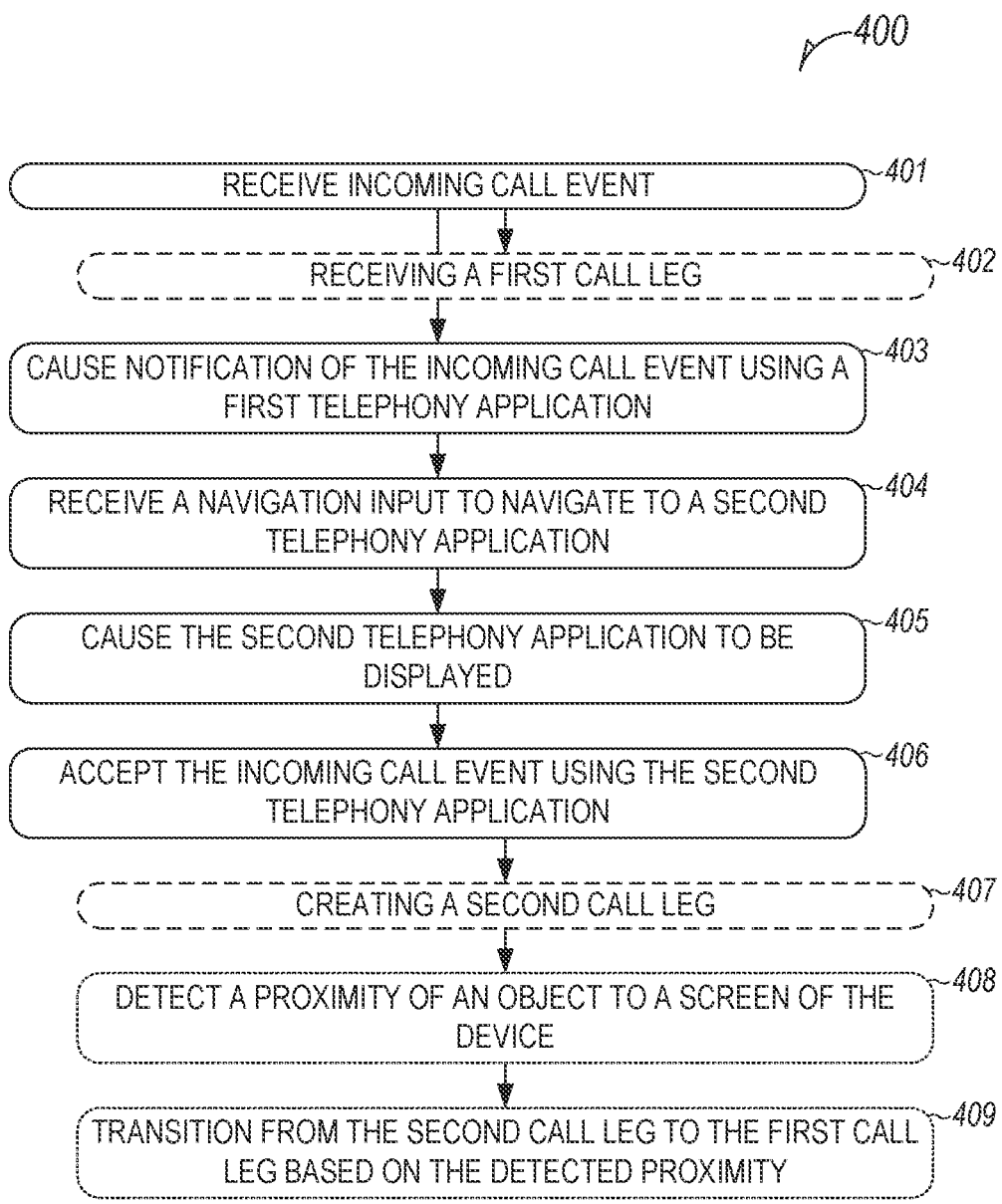
FIG. 4 illustrate an example method for triggering hand-off of an incoming call event from a default first telephony application to a second telephony application.

FIG. 4 illustrate an example method 400 for triggering hand-off of an incoming call event from a default first telephony application to a second telephony application on a device, such as a first user device 101 of a first user, etc.

At step 401, an incoming call event can be received. For example, hardware of the device, such as a transceiver and associated circuits and processor (e.g., a baseband processor, etc.), etc. can receive the incoming call event addressed to the device using one or more device identification, such as a subscriber identity of a subscriber identity module (SIM) device of the device, etc. At step 402, the incoming call event can optionally be a first call leg received over a first connection to a telecommunication network, such as with respect to a particular call of a particular type (e.g., a cellular voice call, etc.) placed to the device from another device through the telecommunication network.

At step 403, a notification of the incoming call can be provided using a default first telephony application of the device, such as the native dialer of the device, the default Phone application, etc. In an example, the incoming call event, received through the transceiver, can trigger the device to provide the notification, such as a ringing, vibrating, or other notification through the default first telephony application that an incoming call event has been received.

At step 404, a navigation input can be received to navigate to a second telephony application, such as during the received notification or for a time period after receiving a first notification (e.g., 10 seconds, 15 seconds, while the device is ringing or after silencing the notification or navigating away from the notification on the default telephony application, etc.). In certain examples, during the notification of the incoming call event, and without answering the incoming call event (and in certain examples, without declining the incoming call event by selecting a decline or "do not answer" selection) using the default first telephony application, a navigation input can be received on a user interface of the device to either minimize the default first telephony application, open an application picker on the device, or otherwise navigate away from the notification to a second telephony application on the device. In an example, the second telephony application can include a meeting application (e.g., Microsoft Teams) installed or executed on the device configured to provide call or meeting services on the device.

In an example, the default first telephony application can be associated with a first SIM device or a first phone number and the second telephony application can be associated with a second SIM device or a second phone number, different than the first. In other examples, the default first telephony application and the second telephony application can both be associated with the same SIM device or the same phone number.

At step 405, the second telephony application can be displayed. For example, responsive to receiving the input to navigate to the second telephony application on the device, the device can cause the second telephony application to be displayed on a screen of the device.

At step 406, the incoming call event can be accepted using the second telephony application. In certain examples, responsive to receiving the input to navigate to the second telephony application on the device, the incoming call event can be accepted using the second telephony application, creating a telephony connection corresponding to the incoming call event. At step 407, the telephony connection corresponding to the incoming call event can be accepted using the second telephony application, including a second call leg, separate from the first call leg, such as with respect to a particular call of a particular type (e.g., a data call through a meeting application executed on the device that supports video and content sharing features using a data connection to a meeting service, etc.), different than the call type of step 402. In an example, accepting the second call leg can include accepting a data connection to the meeting service to support and execute video and content sharing features of the meeting application.

In certain examples, a call event continuity identifier unique to the incoming call event can be associated with each of the first and second call legs so that the first and second call legs are connectable at a common port in the telecommunication network, such as for later transition or handover, or to optionally keep both legs open and active for a time or the duration of the call to determine the best quality connection of the multiple legs. For example, accepting the second call leg can include determining a quality of the second connection to the telecommunication network and comparing the determined quality of the second connection to a threshold, executing the incoming call event using the first call leg if the determined quality of the second connection is below the threshold, and executing the incoming call event using the second call leg if the determined quality of the second connection is above the threshold. The threshold can be determined as a connection quality or bandwidth threshold, etc.

In certain examples, accepting the incoming call event at the second telephony application includes creating the telephony connection corresponding to the incoming call event between the second telephony application and a network resource providing the call event, responsive to receiving the input to navigate to the second telephony application on the device during the notification of the incoming call event to without receiving an action to answer the incoming call event using the default first telephony application.

At step 408, a proximity of an object to a screen of the device can be detected, such as by a proximity detector of the device. In certain examples, the device, such as using the proximity detector or a camera of the device, can determine whether the first user of the device is looking at the device screen, or whether the device is face down (e.g., on a table, in a pocket, in a purse, etc.), or whether the first user has the device placed against their ear.

At step 409, the second call leg can transition to the first call leg based on the detected proximity. In certain examples, if the device is determined to be at the ear of the first user, the screen can be turned off, such as to save battery life of the device. In addition, the call can be transitioned from the second leg, supporting one or more video or sharing features, etc., to the first leg, such as a cellular voice call, to reduce the amount of information transmitted over the telecommunication network, or captured, sent from, received by, or processed by the device with respect to the call event. In certain examples, both legs can be maintained, such as to later transition back to the second leg if the user is determined to have taken the device away from their ear or determined to be looking at the screen, or otherwise activates the screen or selects share or one or more camera features for the call event, etc.

Figure 5:
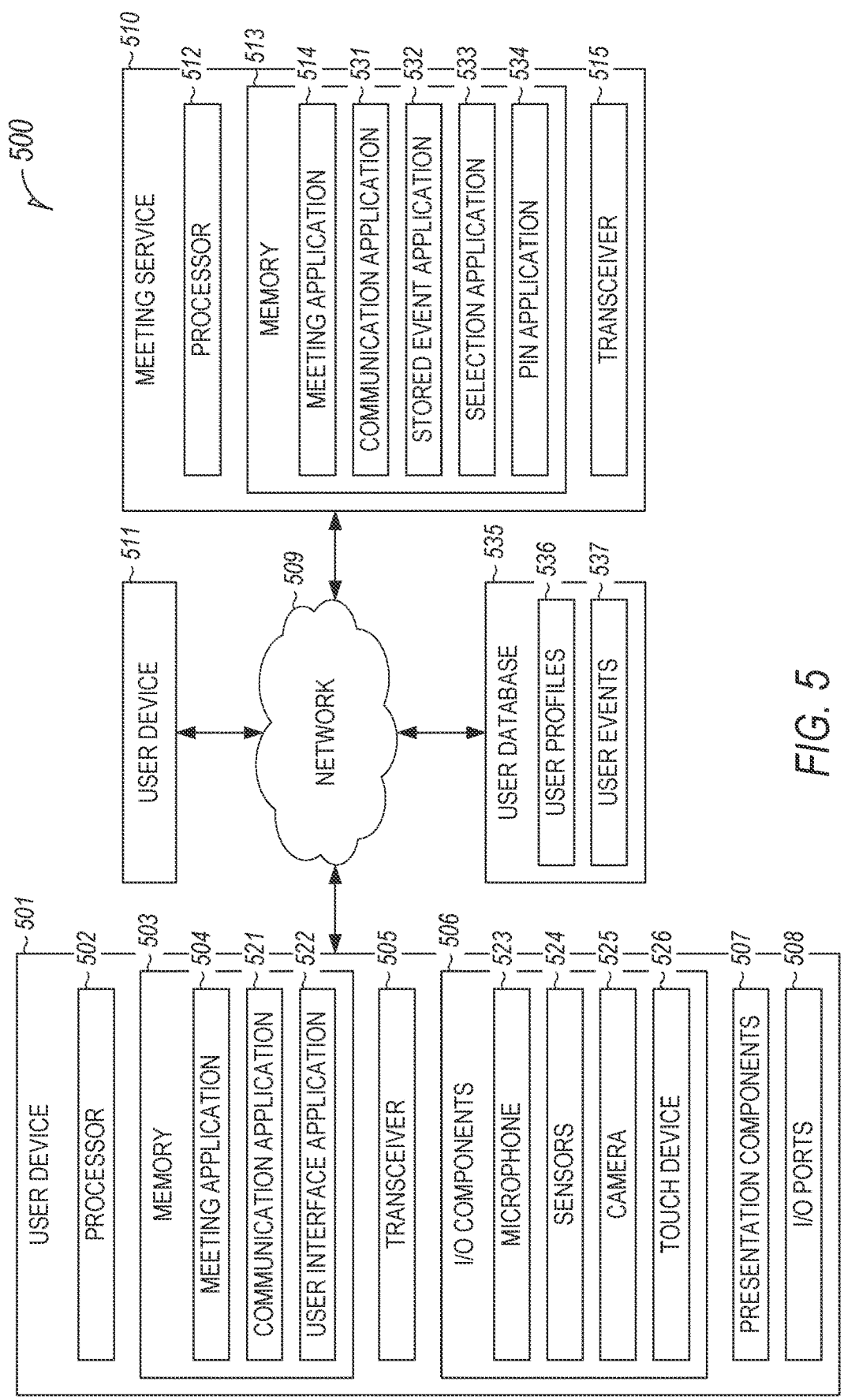
FIG. 5 illustrates an example networking environment including one or more user devices, a communication server, and a user database communicating over a network.

FIG. 5 illustrates an example system 500 including first and second user devices 501, 511 in a networking environment including a meeting service 510 and a user database 535 communicating over a network 509.

The first user device 501 is exemplary, and can include a processor 502 (e.g., one or more processors), a memory 503, a transceiver 505, input/output (I/O) components 506, one or more presentation components 507, and one or more I/O ports 508. The first user device 501 can take the form of a mobile computing device or any other portable device, such as a mobile telephone, laptop, tablet, computing pad, notebook, gaming device, portable media player, etc. In other examples, the first user device 501 can include a less portable device, such as desktop personal computer, kiosk, tabletop device, industrial control device, etc. Other examples can incorporate the first user device 501 as part of a multi-device system in which two separate physical devices share or otherwise provide access to the illustrated components of the first user device 501.

The processor 502 can include any quantity of processing units and is programmed to execute computer-executable instructions for implementing aspects of the disclosure. The instructions may be performed by the processor or by multiple processors within the computing device or performed by a processor external to the first user device 501. In some examples, the processor 502 is programmed to execute methods, such as the one or more methods illustrated herein, etc. Additionally, or alternatively, the processor 502 can be programmed to present an experience in a user interface ("UI"). For example, the processor 502 can represent an implementation of techniques to perform the operations described herein.

The transceiver 505 can include an antenna capable of transmitting and receiving radio frequency ("RF") signals and various antenna and corresponding chipsets to provide communicative capabilities between the first user device 501 and one or more other remote devices. Examples are not limited to RF signaling, however, as various other communication modalities may alternatively be used.

The presentation components 507 can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user of the first user device 501 or provide information visibly or audibly on the first user device 501. For example, the first user device 501 can include a smart phone or a mobile tablet including speakers capable of playing audible search results to the user. In other examples, the first user device 501 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio presentation components 507.

I/O ports 508 allow the first user device 501 to be logically coupled to other devices and I/O components 516, some of which may be built into the first user device 501 while others may be external. 1/O components 506 can include a microphone 523, one or more sensors 524, a camera 525, and a touch device 526. The microphone 523 can capture speech from the user and/or speech of or by the user. The sensors 524 can include any number of sensors on or in a mobile computing device, electronic toy, gaming console, wearable device, television, vehicle, or other device, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user or the environment. The camera 525 can capture images or video of or by the user. The touch device 526 can include a touchpad, track pad, touch screen, or other touch-capturing device. In other examples, the I/O components 506 can include one or more of a sound card, a vibrating device, a scanner, a printer, a wireless communication device, or any other component for capturing information related to the user or the environment.

The memory 503 can include any quantity of memory associated with or accessible by the first user device 501. The memory 503 can be internal to the first user device 501, external to the first user device 501, or a combination thereof. The memory 503 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the first user device 501. The terms computer-readable medium, machine readable medium, and storage device do not include carrier waves to the extent carrier waves are deemed too transitory. The memory 503 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 503 can be distributed across multiple user devices, such as in a virtualized environment in which instruction processing is carried out on multiple ones of the first user device 501. The memory 503 can store, among other data, various device applications that, when executed by the processor 502, operate to perform functionality on the first user device 501. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 509. For example, the applications can include client-operating applications that correspond to server-side applications executing on remote servers or computing devices in the cloud.

Instructions stored in the memory 503 can include, among other things, one or more of a meeting application 504, a communication application 521, and a user interface application 522 executed on the first user device 501. The communication application 521 can include one or more of computer-executable instructions for operating a network interface card and a driver for operating the network interface card. Communication between the first user device 501 and other devices can occur using any protocol or mechanism over a wired or wireless connection or across the network 509. In some examples, the communication application 521 is operable with RF and short-range communication technologies using electronic tags, such as NFC tags, Bluetooth® brand tags, etc.

In some examples, the user interface application 522 includes a graphics application for displaying data to the user and receiving data from the user. The user interface application 522 can include computer-executable instructions for operating the graphics card to display search results and corresponding images or speech on or through the presentation components 507. The user interface application 522 can interact with the various sensors 524 and camera 525 to both capture and present information through the presentation components 507.

The meeting service 510 can be configured to receive user and environment data, such as received from the first and second user devices 501, 511, or one or more other devices, over the network 509. In certain examples, the meeting service 510 can include one or more servers, memory, databases, or processors, configured to execute different web-service computer-executable instructions, and can be configured to provide and manage one or more meeting services for one or more users or groups of users, such as users of the first and second user devices 501, 511. The meeting service 510 can be capable of providing and receiving messages or other information including images, videos, audio, text, and other communication media to or from the first and second user devices 501, 511 over the network 509.

The networking environment illustrated in FIG. 5 is an example of one suitable computing system environment and is not intended to suggest any limitation as to the scope of use or functionality of examples disclosed herein. The illustrated networking environment should not be interpreted as having any dependency or requirement related to any single component, module, index, or combination thereof, and in other examples, other network environments are contemplated.

The network 509 can include the internet, a private network, a local area network (LAN), a wide area network (WAN), or any other computer network, including various network interfaces, adapters, modems, and other networking devices for communicatively connecting the first and second user devices 501, 511 and the meeting service 510. The network 509 can also include configurations for point-to-point connections.

The meeting service 510 includes a processor 512 to process executable instructions, a memory 513 embodied with executable instructions, and a transceiver 515 to communicate over the network 509. The memory 513 can include one or more of: a meeting application 514, a communication application 531, a stored event application 532, a selection application 533, a pin application 534, or one or more other applications, modules, or devices, etc. While the meeting service 510 is illustrated as a single box, it is not so limited, and can be scalable. For example, the meeting service 510 can include multiple servers operating various portions of software that collectively generate composite icons or templates for users of the first and second user devices 501, 511.

The user database 535 can provide backend storage of Web, user, and environment data that can be accessed over the network 509 by the meeting service 510 or the first user device 501 and used by the meeting service 510 to combine subsequent data in a communication stream. The Web, user, and environment data stored in the database includes, for example but without limitation, one or more user profiles 536 and user events 537. Additionally, though not shown for the sake of clarity, the servers of the user database 535 can include their own processors, transceivers, and memory. Also, the networking environment depicts the user database 535 as a collection of separate devices from the meeting service 510. However, examples can store the discussed Web, user, and environment data shown in the user database 535 on the meeting service 510.

The user profiles 536 can include electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc.

Additionally, the user profiles 536 can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 536 can be expanded to encompass various other aspects of the user.

The present disclosure relates to systems and methods for triggering hand-off of an incoming call event from a default first telephony application to a second telephony application on a device according to at least the examples provided in the sections below:

(A1) In one aspect, some embodiments or examples include receiving an incoming call event addressed to the device, causing a notification of the incoming call event using the default first telephony application on the device, during the notification of the incoming call event, and without answering the incoming call event using the default first telephony application, receiving a navigation input on a user interface of the device to navigate to the second telephony application on the device, and responsive to receiving the input to navigate to the second telephony application on the device, causing the second telephony application to be displayed on the device, and accepting the incoming call event using the second telephony application, creating a telephony connection corresponding to the incoming call event.

(A2) In some embodiments of A1, receiving the incoming call event using the default first telephony application includes receiving a cellular network voice call event having a first call leg over a first connection to a telecommunication network, and accepting the incoming call event using the second telephony application includes accepting a second call leg to the telecommunication network, and associating a call event continuity identifier unique to the incoming call event with each of the first and second call legs so that the first and second call legs are connectable at a common port in the telecommunication network.

(A3) In some embodiments of A1-A2, the second telephony application includes a meeting application executed on the device that supports video and content sharing features using a data connection to a meeting service, and accepting the second call leg includes accepting a data connection to the meeting service to support and execute video and content sharing features of the meeting application.

(A4) In some embodiments of A1-A3, accepting the incoming call event using the second telephony application includes determining a quality of the second connection to the telecommunication network and comparing the determined quality of the second connection to a threshold, executing the incoming call event using the first call leg if the determined quality of the second connection is below the threshold, and executing the incoming call event using the second call leg if the determined quality of the second connection is above the threshold.

(A5) In some embodiments of A1-A4, the default first telephony application is associated with a first subscriber identity module (SIM) device, and the second telephony application is associated with a second SIM device, different than the first SIM device.

(A6) In some embodiments of A1-A5, the default first telephony application is associated with a first subscriber identity module (SIM) device and the second telephony application is associated with the first SIM device.

(A7) In some embodiments of A1-A6, the default first telephony application is associated with a first phone number and the second telephony application is associated with a second phone number.

(A8) In some embodiments of A1-A7, the default first telephony application and the second telephony application are associated with a same phone number.

(A9) In some embodiments of A1-A8, some embodiments or examples include detecting a proximity of an object to a screen of the device, determining if a screen of the device is viewable to a user based on the detected proximity, and causing a transition from the second call leg to the first call leg based on determining that the screen of the device is not viewable to the user.

(A10) In some embodiments of A1-A9, accepting the incoming call event at the second telephony application includes creating the telephony connection corresponding to the incoming call event between the second telephony application and a network resource providing the call event, responsive to receiving the input to navigate to the second telephony application on the device during the notification of the incoming call event to without receiving an action to answer the incoming call event using the default first telephony application.

In yet another aspect, some embodiments include a system including a processor and a memory device coupled to the processor and having a program stored thereon for execution by the processor to perform operations comprising any of the embodiments of A1-A10 described above in various combinations or permutations. In yet another aspect, some embodiments include a non-transitory computer-readable storage medium storing one or more programs for execution by one or more processors of a storage device, the one or more programs including instructions for performing any of the embodiments of A1-A10 described above in various combinations or permutations. In yet another aspect, some embodiments include a method or a system including means for performing any of the embodiments of A1-A10 described above in various combinations or permutations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A system for triggering hand-off of an incoming call event from a default first telephony application to a second telephony application on a device, comprising:
   one or more processors; and
   a memory storing computer-executable instructions that, when executed, cause the one or more processors to control the system to perform operations comprising:
      receiving an incoming call event addressed to the device;
      causing a notification of the incoming call event using the default first telephony application on the device;
      during the notification of the incoming call event, and without answering the incoming call event using the default first telephony application, receiving a navigation input on a user interface of the device to navigate to the second telephony application on the device; and
      responsive to receiving the input to navigate to the second telephony application on the device:
         causing the second telephony application to be displayed on the device; and
         accepting the incoming call event using the second telephony application, creating a telephony connection corresponding to the incoming call event.

2. The system of claim 1,
wherein receiving the incoming call event using the default first telephony application includes receiving a cellular network voice call event having a first call leg over a first connection to a telecommunication network, and
wherein accepting the incoming call event using the second telephony application includes:
   accepting a second call leg to the telecommunication network; and
   associating a call event continuity identifier unique to the incoming call event with each of the first and second call legs so that the first and second call legs are connectable at a common port in the telecommunication network.

3. The system of claim 2,
wherein the second telephony application includes a meeting application executed on the device that supports video and content sharing features using a data connection to a meeting service, and
wherein accepting the second call leg includes accepting a data connection to the meeting service to support and execute video and content sharing features of the meeting application.

4. The system of claim 2,
wherein accepting the incoming call event using the second telephony application includes:
   determining a quality of the second connection to the telecommunication network and comparing the determined quality of the second connection to a threshold;
   executing the incoming call event using the first call leg if the determined quality of the second connection is below the threshold; and
   executing the incoming call event using the second call leg if the determined quality of the second connection is above the threshold.

5. The system of claim 2,
wherein the default first telephony application is associated with a first subscriber identity module (SIM) device, and
wherein the second telephony application is associated with a second SIM device, different than the first SIM device.

6. The system of claim 2,
wherein the default first telephony application is associated with a first subscriber identity module (SIM) device and the second telephony application is associated with the first SIM device.

7. The system of claim 2,
wherein the default first telephony application is associated with a first phone number, and
wherein the second telephony application is associated with a second phone number.

8. The system of claim 2,
wherein the default first telephony application and the second telephony application are associated with a same phone number.

9. The system of claim 2, the operations comprising:
detecting a proximity of an object to a screen of the device;
determining if a screen of the device is viewable to a user based on the detected proximity; and
causing a transition from the second call leg to the first call leg based on determining that the screen of the device is not viewable to the user.

10. The system of claim 1,
wherein accepting the incoming call event at the second telephony application includes creating the telephony connection corresponding to the incoming call event between the second telephony application and a network resource providing the call event, responsive to receiving the input to navigate to the second telephony application on the device during the notification of the incoming call event to without receiving an action to answer the incoming call event using the default first telephony application.

11. A method for triggering hand-off of an incoming call event from a default first telephony application to a second telephony application on a device, comprising:
   receiving an incoming call event addressed to the device;
   causing a notification of the incoming call event using the default first telephony application on the device;
   during the notification of the incoming call event, and without answering the incoming call event using the default first telephony application, receiving a navigation input on a user interface of the device to navigate to the second telephony application on the device; and
   responsive to receiving the input to navigate to the second telephony application on the device:
      causing the second telephony application to be displayed on the device; and
      accepting the incoming call event using the second telephony application, creating a telephony connection corresponding to the incoming call event.

12. The method of claim 11,
   wherein receiving the incoming call event using the default first telephony application includes receiving a cellular network voice call event having a first call leg over a first connection to a telecommunication network, and
   wherein accepting the incoming call event using the second telephony application includes:
      accepting a second call leg to the telecommunication network; and
      associating a call event continuity identifier unique to the incoming call event with each of the first and second call legs so that the first and second call legs are connectable at a common port in the telecommunication network.

13. The method of claim 12,
   wherein the second telephony application includes a meeting application executed on the device that supports video and content sharing features using a data connection to a meeting service, and
   wherein accepting the second call leg includes accepting a data connection to the meeting service to support and execute video and content sharing features of the meeting application.

14. The method of claim 12,
   wherein accepting the incoming call event using the second telephony application includes:
      determining a quality of the second connection to the telecommunication network and comparing the determined quality of the second connection to a threshold;
      executing the incoming call event using the first call leg if the determined quality of the second connection is below the threshold; and
      executing the incoming call event using the second call leg if the determined quality of the second connection is above the threshold.

15. The method of claim 12,
   wherein the default first telephony application is associated with a first subscriber identity module (SIM) device, and
   wherein the second telephony application is associated with a second SIM device, different than the first SIM device.

16. The method of claim 12,
   wherein the default first telephony application is associated with a first subscriber identity module (SIM) device and the second telephony application is associated with the first SIM device.

17. The method of claim 12,
   wherein the default first telephony application and the second telephony application are associated with a same phone number.

18. The method of claim 12, comprising:
   detecting a proximity of an object to a screen of the device;
   determining if a screen of the device is viewable to a user based on the detected proximity; and
   causing a transition from the second call leg to the first call leg based on determining that the screen of the device is not viewable to the user.

19. The method of claim 11,
   wherein accepting the incoming call event at the second telephony application includes creating the telephony connection corresponding to the incoming call event between the second telephony application and a network resource providing the call event, responsive to receiving the input to navigate to the second telephony application on the device during the notification of the incoming call event to without receiving an action to answer the incoming call event using the default first telephony application.

20. A system for triggering hand-off of an incoming call event from a default first telephony application to a second telephony application on a device, comprising:
   means for receiving an incoming call event addressed to the device;
   means for causing a notification of the incoming call event using the default first telephony application on the device;
   means for receiving a navigation input on a user interface of the device, during the notification of the incoming call event, and without answering the incoming call event using the default first telephony application, to navigate to the second telephony application on the device;
   means for causing the second telephony application to be displayed on the device responsive to receiving the input to navigate to the second telephony application on the device; and
   means for accepting the incoming call event using the second telephony application responsive to receiving the input to navigate to the second telephony application on the device, creating a telephony connection corresponding to the incoming call event.

\* \* \* \* \*